United States Patent
Kaiser

(10) Patent No.: US 11,846,246 B2
(45) Date of Patent: Dec. 19, 2023

(54) METHODS AND SYSTEMS FOR CONTROLLING ENGINE INLET PRESSURE VIA A FUEL DELIVERY SYSTEM OF A TRANSPORT CLIMATE CONTROL SYSTEM

(71) Applicant: THERMO KING LLC, Minneapolis, MN (US)

(72) Inventor: Joseph R. Kaiser, Cottage Grove, MN (US)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 17/332,712

(22) Filed: May 27, 2021

(65) Prior Publication Data

US 2022/0381198 A1 Dec. 1, 2022

(51) Int. Cl.
| | | |
|---|---|---|
| F02D 41/38 | (2006.01) | |
| F02M 37/32 | (2019.01) | |
| F02M 37/00 | (2006.01) | |
| B60H 1/00 | (2006.01) | |
| F02M 37/54 | (2019.01) | |
| B60K 15/03 | (2006.01) | |

(52) U.S. Cl.
CPC ..... F02D 41/3863 (2013.01); B60H 1/00507 (2013.01); F02M 37/0052 (2013.01); F02M 37/32 (2019.01); F02M 37/54 (2019.01); B60K 15/03 (2013.01)

(58) Field of Classification Search
CPC ............ F02D 41/3863; B60H 1/00507; F02M 37/0052; F02M 37/32; F02M 37/54; B60K 15/03

USPC .................................. 123/510–516, 456–460
See application file for complete search history.

(56) References Cited

U.S. PATENT DOCUMENTS

| | | | | |
|---|---|---|---|---|
| 3,871,188 A * | 3/1975 | Vold | ...................... | F25D 19/003 62/448 |
| 4,660,531 A * | 4/1987 | Lauterbach | .......... | F02M 69/465 123/456 |
| 4,829,957 A * | 5/1989 | Garretson | .......... | F02M 21/0239 123/527 |
| 5,425,342 A * | 6/1995 | Ariga | ...................... | F02M 69/54 123/456 |

(Continued)

FOREIGN PATENT DOCUMENTS

DE 102012200706 A1 * 7/2013 ......... F02M 37/0023

*Primary Examiner* — Sizo B Vilakazi
*Assistant Examiner* — Brian R Kirby
(74) *Attorney, Agent, or Firm* — Hamre, Schumann, Mueller & Larson, P.C.

(57) ABSTRACT

A fuel delivery system for controlling an inlet pressure of a prime mover in a transport climate control system is provided. The fuel delivery system includes a fuel tank, a pressure regulator, a pump disposed downstream of the fuel tank, a first filter disposed downstream of the pump, and the prime mover disposed downstream of the first filter. The prime mover is located above the fuel tank in a vertical direction. The pump is configured to provide a first fuel flow through the first filter. The prime mover is configured to accept a first portion of the first fuel flow and is configured to provide a return fuel flow. The pressure regulator is disposed downstream of the first filter. The pressure regulator is configured to accept a second portion of the first fuel flow, and to accept a pressure of the return fuel flow as a reference pressure.

20 Claims, 7 Drawing Sheets

(56) References Cited

U.S. PATENT DOCUMENTS

| | | | | |
|---|---|---|---|---|
| 5,749,345 A * | 5/1998 | Treml | F02M 37/0094 | 123/456 |
| 5,887,573 A * | 3/1999 | Janik | F02M 37/48 | 123/514 |
| 6,058,912 A * | 5/2000 | Rembold | F02M 63/0225 | 123/456 |
| 6,722,857 B1 * | 4/2004 | Kellner | F04B 49/243 | 123/446 |
| 6,729,309 B2 * | 5/2004 | Schueler | F02M 37/0052 | 123/514 |
| 7,044,110 B2 * | 5/2006 | Geyer | F02M 53/00 | 123/456 |
| 7,156,076 B2 * | 1/2007 | Holl | F02M 63/005 | 123/456 |
| 7,640,919 B1 * | 1/2010 | Smith | F02M 37/0058 | 123/511 |
| 8,851,051 B2 * | 10/2014 | Ziegler | F02M 55/004 | 123/468 |
| 10,954,904 B2 * | 3/2021 | Volk | F02M 63/0225 | |
| 2001/0018907 A1 * | 9/2001 | Kondou | F02M 37/04 | 123/514 |
| 2005/0129532 A1 * | 6/2005 | Sano | F02M 59/44 | 417/273 |
| 2005/0150480 A1 * | 7/2005 | Hoffmann | F02M 53/00 | 123/541 |
| 2006/0225711 A1 * | 10/2006 | Schelhas | F02M 69/54 | 123/460 |
| 2008/0236550 A1 * | 10/2008 | Kobayashi | F02M 37/0094 | 123/514 |
| 2009/0139920 A1 * | 6/2009 | Dhawale | B01D 35/147 | 210/123 |
| 2009/0151700 A1 * | 6/2009 | Kondoh | F02M 59/34 | 123/514 |
| 2009/0283074 A1 * | 11/2009 | Narisako | F02M 37/40 | 123/514 |
| 2010/0192924 A1 * | 8/2010 | Schweikart | F02M 37/0052 | 251/12 |
| 2011/0023832 A1 * | 2/2011 | Brown | F02M 55/002 | 123/456 |
| 2012/0132177 A1 * | 5/2012 | Kristen | F04B 1/0404 | 123/456 |
| 2013/0025572 A1 * | 1/2013 | Takata | F02M 37/106 | 123/506 |
| 2013/0213357 A1 * | 8/2013 | Yudanov | F02M 37/0052 | 123/445 |
| 2013/0312706 A1 * | 11/2013 | Salvador | F02M 37/0023 | 137/511 |
| 2014/0076281 A1 * | 3/2014 | Bernhaupt | F02M 37/0029 | 123/456 |
| 2015/0292453 A1 * | 10/2015 | Ricke | F02M 37/0052 | 123/485 |

* cited by examiner

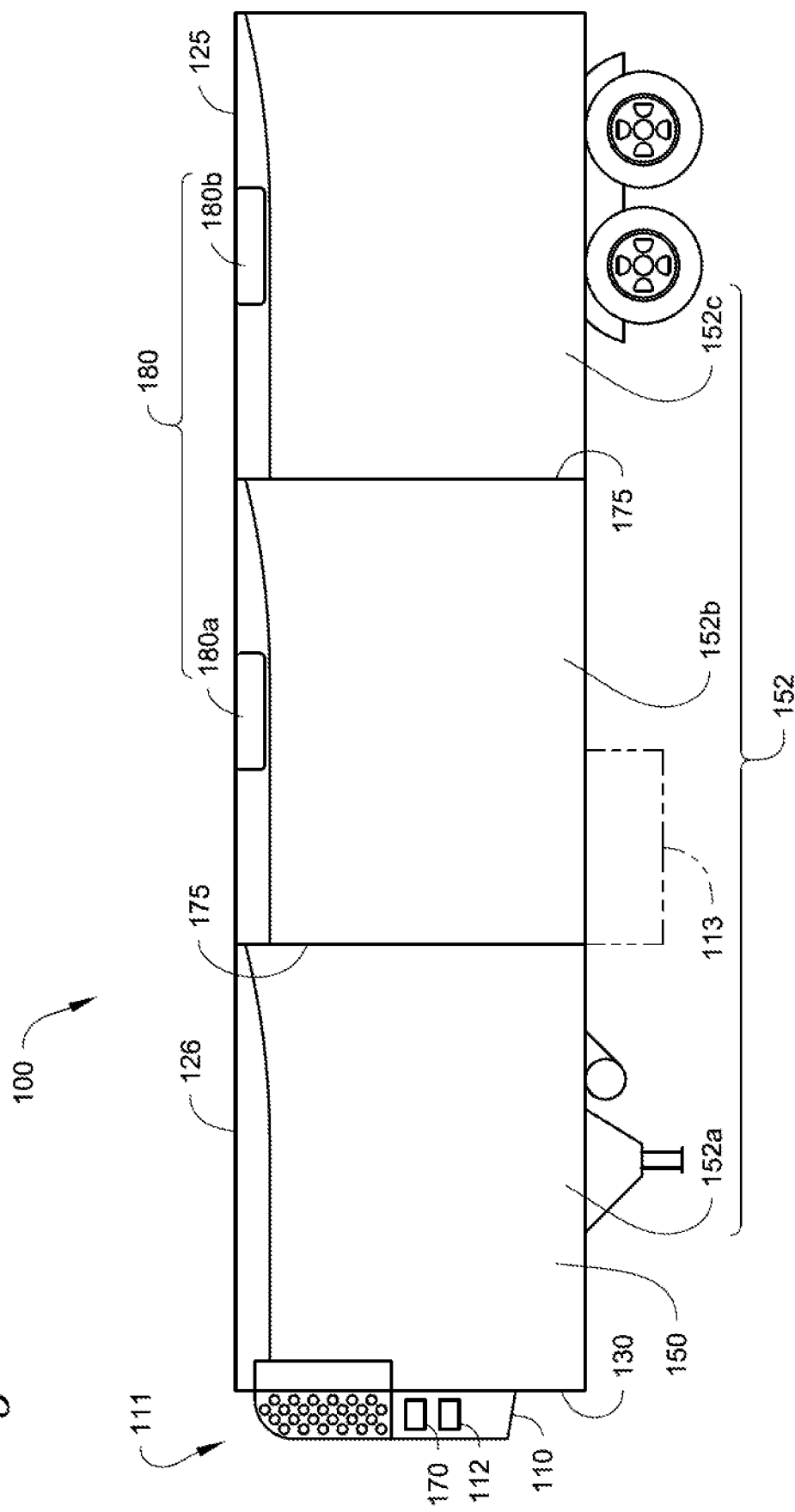

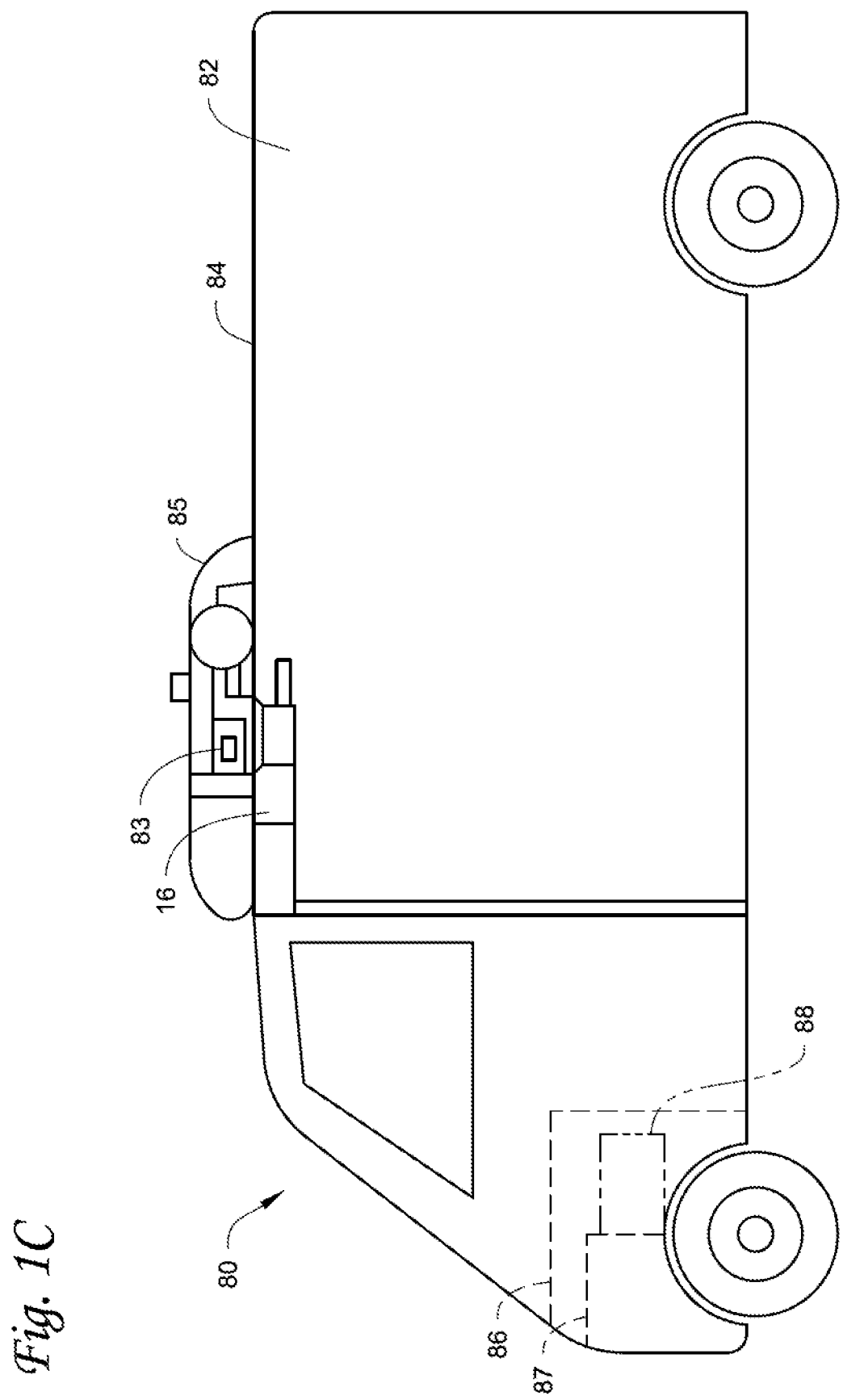

METHODS AND SYSTEMS FOR CONTROLLING ENGINE INLET PRESSURE VIA A FUEL DELIVERY SYSTEM OF A TRANSPORT CLIMATE CONTROL SYSTEM

FIELD

This disclosure relates generally to a fuel delivery system in a transport climate control system. More specifically, the disclosure relates to methods and systems for controlling an inlet pressure of a prime mover via a fuel delivery system in a transport climate control system.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

SUMMARY

It can be desirable to properly manage and/or control inlet fuel pressure of a prime mover of a transport climate control system (such as a trailer transport refrigeration system) to meet, for example, the requirements or criteria prescribed by the prime mover manufacturer. As the fuel filter becomes dirty and clogged over its life, the inlet pressure of the prime mover might drop below a predetermined level, particularly when the fuel delivery system does not have a mechanism to compensate for increased system resistance. In cold weather conditions (e.g., winter), especially when the fuel is not properly treated for such conditions, system pressure compensation may also be needed. Other factors that might impact the inlet pressure of the prime mover can include air and/or water bleeds. When air and/or water bleeds flow in reverse (instead of escaping the fuel supply line and back to the fuel tank) through a bleeder and allow the prime mover to ingest a portion of return fuel, the inlet temperature of the prime mover may increase and the prime mover may inject air that has built up in the system. The inlet temperature rise can contribute to injector sticking due to deposit buildup. Ingesting air can have a negative impact on the pressure control within the fuel system of the prime mover, and on certain types of prime movers may result in the prime mover shutting down due to lack of fuel.

Embodiments disclosed herein can control the inlet pressure of the prime mover to stay within prescribed limits by the prime mover manufacturer, across an expected range of fuel filter loading. Embodiments disclosed herein can also provide air and/or water bleed functions to reduce inlet temperature of the prime mover and minimize air reaching the prime mover.

In an embodiment, a fuel delivery system for controlling an inlet pressure of a prime mover in a transport climate control system is provided. The fuel delivery system includes a fuel tank, a pressure regulator, a pump disposed downstream of the fuel tank, a first filter disposed downstream of the pump, and the prime mover disposed downstream of the first filter. The prime mover is located above the fuel tank in a vertical direction. The pump is configured to provide a first fuel flow through the first filter. The prime mover is configured to accept a first portion of the first fuel flow as an input fuel flow and is configured to provide a return fuel flow. The pressure regulator is disposed downstream of the first filter. The pressure regulator is configured to accept a second portion of the first fuel flow as an input fuel flow and to accept a pressure of the return fuel flow as a reference pressure.

In another embodiment, a method of controlling an inlet pressure of a prime mover via a fuel delivery system in a transport climate control system is provided. The fuel delivery system includes a fuel tank, a pressure regulator, a pump disposed downstream of the fuel tank, a first filter disposed downstream of the pump, and the prime mover disposed downstream of the first filter. The prime mover is located above the fuel tank in a vertical direction. The pressure regulator is disposed downstream of the first filter. The method includes pumping, by the pump, a first fuel flow through the first filter. The method also includes accepting, by the prime mover, a first portion of the first fuel flow as an input fuel flow. The method further includes providing, by the prime mover, a return fuel flow. Also the method includes accepting, by the pressure regulator, a second portion of the first fuel flow as an input fuel flow. The method also includes accepting, by the pressure regulator, a pressure of the return fuel flow as a reference pressure.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

FIG. 1B illustrates a schematic cross sectional side view of a refrigerated transport unit with a multi-temp transport refrigeration system, according to an embodiment.

FIG. 1C illustrates a side view of a van with a roof mounted vehicle powered transport refrigeration unit, according to an embodiment.

Like reference numbers represent like parts throughout.

DETAILED DESCRIPTION

Figure 1A:
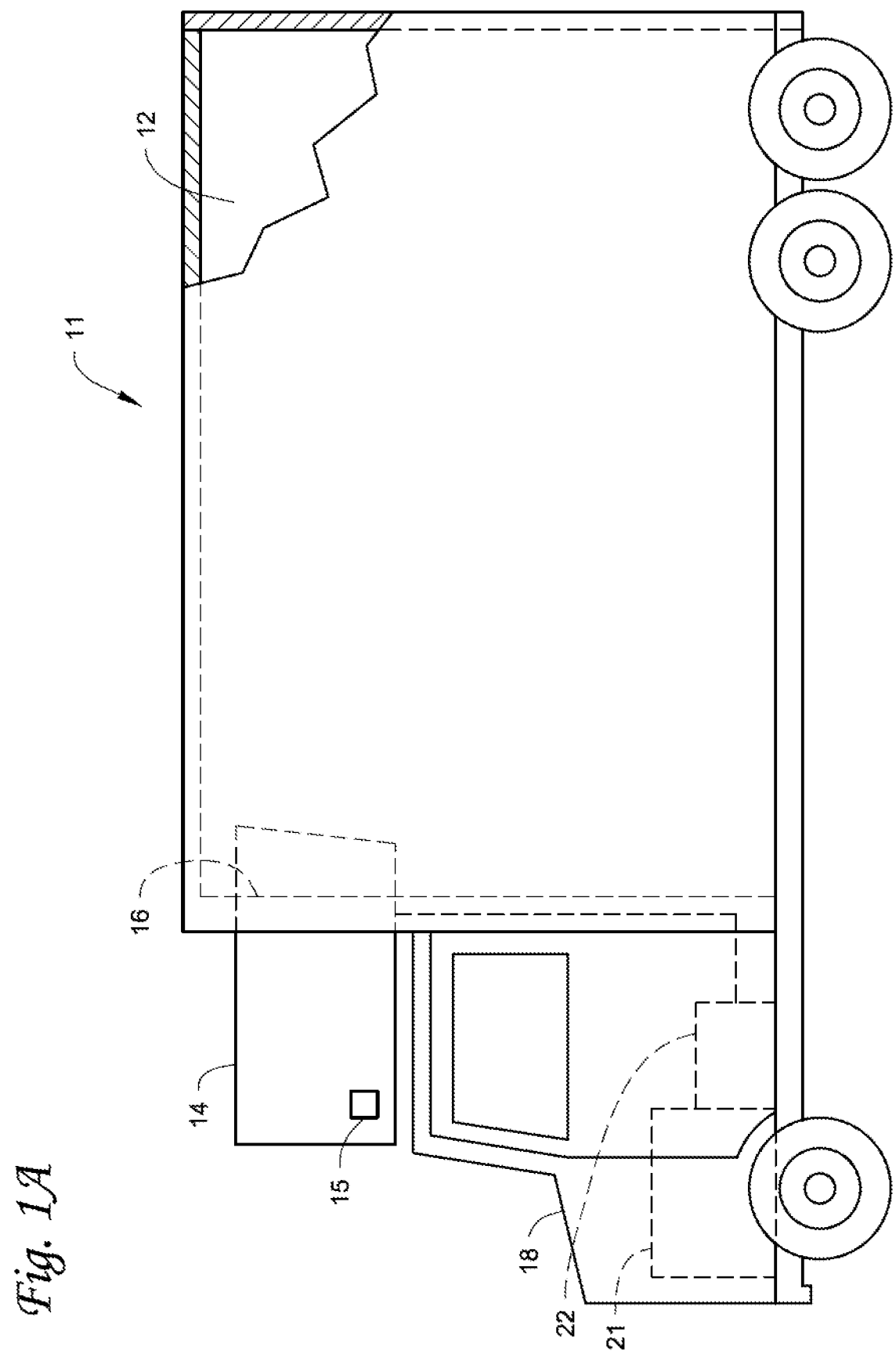
FIG. 1A illustrates a side view of a truck with a front wall mounted vehicle powered transport refrigeration unit, according to an embodiment.

This disclosure relates generally to a fuel delivery system in a transport climate control system. More specifically, the disclosure relates to methods and systems for controlling an inlet pressure of a prime mover via a fuel delivery system in a transport climate control system.

In a fuel system of a transport climate control system (such as a transport refrigeration system), components of other parts of the fuel system including the prime mover (e.g., an engine) may be disposed high above the fuel tank in a vertical direction. In an embodiment, there can be an approximately 30 to 40 feet long fuel line (e.g., at or about ¼ inch diameter) between the fuel tank and the prime mover. Embodiments disclosed herein can provide a fuel pressure regulator to manage and/or control inlet pressure of the prime mover to required or predetermined levels in such fuel system.

Embodiments disclosed herein also provide a pump (e.g., a positive displacement type fuel pump) in combination with the fuel pressure regulator to manage and/or control inlet pressure of the prime mover. Using a positive displacement pump can ensure that the fuel flow rate is maintained through the fuel delivery system regardless of the system restriction (e.g., restriction caused by filter loading over time, fuel temperature in the fuel line, etc.). Embodiments disclosed herein can ensure fuel flow to meet the demand of the prime mover under a wide range of fuel viscosity and/or fuel temperature as well as filter loading conditions, which may impact the inlet pressure of the prime mover.

In an embodiment of a fuel system, an undersized fuel pump may be used, causing the prime mover to e.g., create a vacuum condition which can result in an inlet fuel pressure of the prime mover meeting the prime mover manufacturer's criteria and/or requirements. In an embodiment, a positive displacement pump (e.g., sized for a higher fuel flow than the engine demand) can be provided, which may result in significant overpressure of the prime mover if there is no means of controlling the fuel flow of the fuel delivery system. Embodiments disclosed herein provide a fuel pressure regulator, which is configured to bypass excess fuel flow back to the fuel pump (or to the fuel tank) to match the fuel delivery to the demand of the prime mover, while maintaining fuel pressure in a design target (e.g., at a predetermined level).

Fuel pressure (or a vacuum condition) of the fuel system (e.g., inlet fuel pressure of the prime mover) can be managed or controlled within different ranges depending on the application and design target/desired pressure. In an embodiment, the design of the pressure regulator (e.g., cracking pressure and/or pressure override, etc.) can be adjusted to change the fuel pressure control of the fuel delivery system. In an embodiment, location of the pressure regulator in the fuel delivery system (e.g., immediately after the fuel pump, between filtration stages, immediately prior to the engine, etc.) can be adjusted to change the fuel pressure control of the fuel delivery system. In an embodiment, diameter and layout of fuel lines (e.g., fuel pipes) can be adjusted to increase or decrease system restriction and/or to change the fuel pressure control of the fuel delivery system.

As defined herein, the phrase "vacuum" or "negative pressure" refers to a pressure that is less than the atmosphere pressure. The phrase "pressure" or "positive pressure" refers to a pressure that is greater than the atmosphere pressure. A slight vacuum refers to a pressure that is slightly less (e.g., 0-3 pound-force per square inch (psi) less or 1-2 psi less or the like) than the atmosphere pressure.

As defined herein, the phrase "strainer" refers to an apparatus that removes particles. In an embodiment, a strainer can be a coarse particle filter that removes particles sized at or about 40-60 microns and above or at any other suitable size. In an embodiment, strainers can remove larger particles that are visible in the process fluid (e.g., liquid or gas such as fuel), while other filters can remove contaminants that are often so small that they cannot be seen with the naked eye. It will be appreciated that strainers can be important components of piping systems to protect equipment from potential damage due to dirt and other particles that may be carried by the process fluid.

FIGS. 1A-1D show various transport climate control systems. It will be appreciated that the embodiments described herein are not limited to the examples provided below, but can apply to any type of transport unit (e.g., a truck, a container (such as a container on a flat car, an intermodal container, a marine container, etc.), a box car, a semi-tractor, a passenger bus, or other similar transport unit), etc.

FIG. 1A depicts a temperature-controlled straight truck 11 that includes a conditioned load space 12 for carrying cargo. A transport refrigeration unit (TRU) 14 is mounted to a front wall 16 of the load space 12. The TRU 14 is controlled via a controller 15 to provide temperature control within the load space 12. The truck 11 further includes a vehicle power bay 18, which houses a prime mover 21, such as a combustion engine (e.g., diesel engine, etc.), that provides power to move the truck 11 and to operate the TRU 14. In some embodiments, the prime mover 21 can work in combination with an optional machine 22 (e.g., an alternator) to operate the TRU 14. In an embodiment, the TRU 14 includes a vehicle electrical system. Also, in some embodiments, the truck 11 can be a hybrid vehicle that is powered by the prime mover 21 in combination with a battery power source or can be an electrically driven truck in which the prime mover 21 is replaced with an electric power source (e.g., a battery power source).

FIG. 1B illustrates an embodiment of a MTRS 100 for a TU 125 that can be towed, for example, by a tractor (not shown). The MTRS 100 includes a TRU 110 that provides environmental control (e.g. temperature, humidity, air quality, etc.) within an internal space 150 of the TU 125. The MTRS 100 also includes a MTRS controller 170 and one or more sensors (e.g., Hall effect sensors, current transducers, etc.) that are configured to measure one or more parameters (e.g., ambient temperature, compressor suction pressure, compressor discharge pressure, supply air temperature, return air temperature, humidity, etc.) of the MTRS 100 and communicate parameter data to the MTRS controller 170. The MTRS 100 is powered by a power module 112. The TRU 110 is disposed on a front wall 130 of the TU 125. In other embodiments, it will be appreciated that the TRU 110 can be disposed, for example, on a rooftop 126 or another wall of the TU 125.

In some embodiments, the MTRS 100 can include an undermount unit 113. In some embodiments, the undermount unit 113 can be a TRU that can also provide environmental control (e.g. temperature, humidity, air quality, etc.) within the internal space 150 of the TU 125. The undermount unit 113 can work in combination with the TRU 110 to provide redundancy or can replace the TRU 110. Also, in some embodiments, the undermount unit 113 can be a power module that includes, for example, a generator that can help power the TRU 110.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control operation of the MTRS 100.

As shown in FIG. 1B, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include one or more of a prime mover, a battery, an alternator, a generator, a solar panel, a fuel cell, etc. Also, the prime mover can be a combustion engine or a microturbine engine and can operate as a two speed prime mover, a variable speed prime mover, etc. The power module 112 can provide power to, for example, the MTRS Controller 170, a compressor (not shown), a plurality of DC (Direct Current) components (not shown), a power management unit (not shown), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 112 can include a DC power source (not shown) for providing DC electrical power to the plurality of DC components (not shown), the power management unit (not shown), etc. The DC power source can receive mechanical and/or electrical power from, for example, a utility power source (e.g., Utility power, etc.), a prime mover (e.g., a combustion engine such as a diesel engine, etc.) coupled with a generator machine (e.g., a belt-driven alternator, a direct drive generator, etc.), etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

The internal space 150 can be divided into a plurality of zones 152. The term "zone" means a part of an area of the internal space 150 separated by walls 175. It will be appreciated that the invention disclosed herein can also be used in a single zone TRS.

The MTRS 100 for the TU 125 includes the TRU 110 and a plurality of remote evaporator units 180. The tractor includes a vehicle electrical system for supplying electrical power to the electrical loads of the tractor, the MTRS 100, and/or the TU 125.

FIG. 1C depicts a temperature-controlled van 80 that includes a conditioned load space 82 (or internal space) for carrying cargo. A transport refrigeration unit (TRU) 85 is mounted to a rooftop 84 of the load space 82. The TRU 85 is controlled via a controller 83 to provide temperature control within the load space 82. The van 80 further includes a vehicle power bay 86, which houses a prime mover 87, such as a combustion engine (e.g., diesel engine, etc.), that provides power to move the van 80 and to operate the TRU 85. In some embodiments, the prime mover 87 can work in combination with an optional machine 88 (e.g., an alternator) to operate the TRU 85. In an embodiment, the TRU 85 includes a vehicle electrical system. Also, in some embodiments, the van 80 can be a hybrid vehicle that is powered by the prime mover 87 in combination with a battery power source or can be an electrically driven truck in which the prime mover 87 is replaced with an electric power source (e.g., a battery power source).

Figure 2:
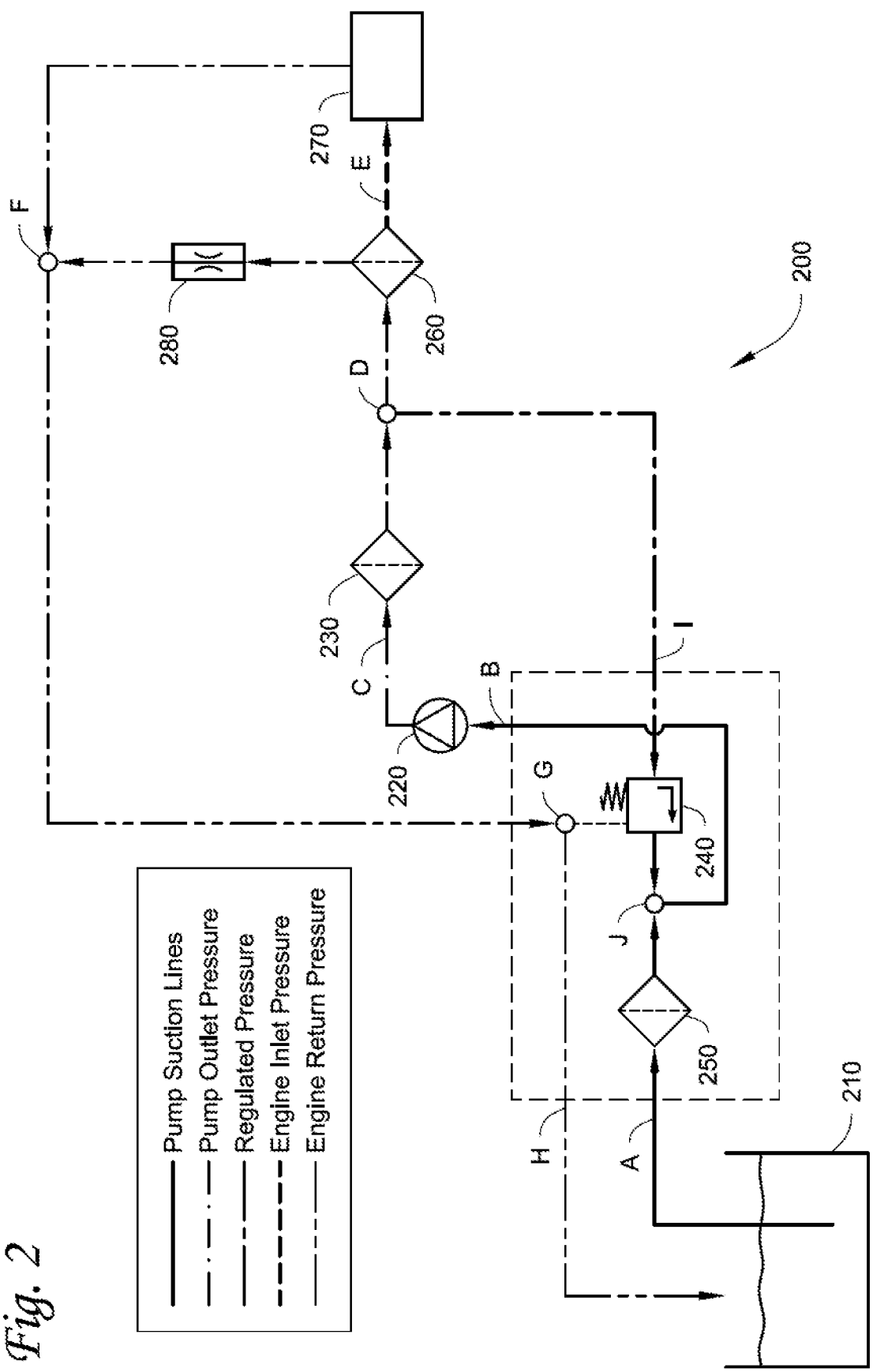
FIG. 2 illustrates a schematic view of a fuel delivery system with a prime mover, according to an embodiment.
Figure 3:
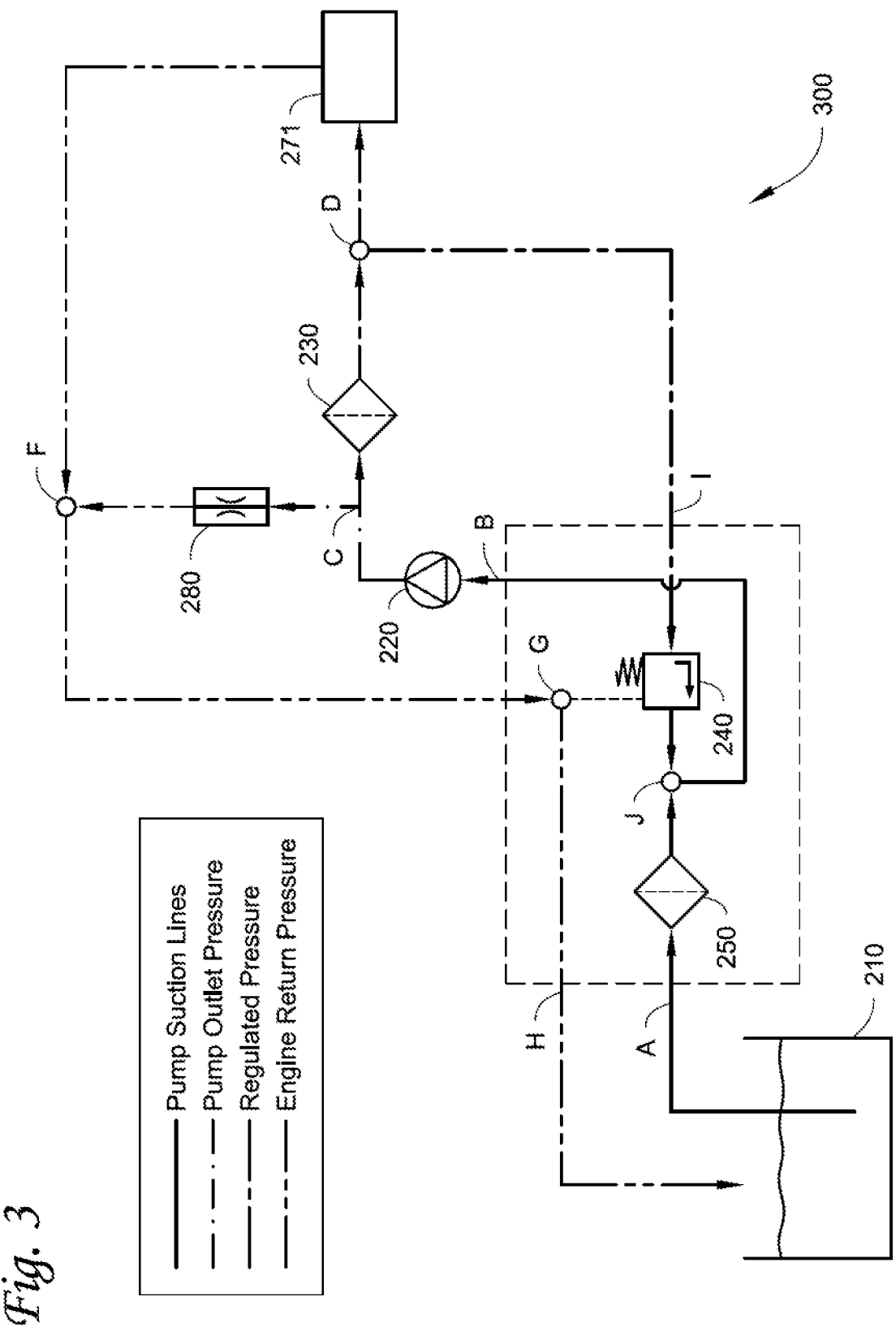
FIG. 3 illustrates a schematic view of a fuel delivery system with a prime mover, according to another embodiment.

FIG. 2 illustrates a schematic view of a fuel delivery system 200 with a prime mover 270, according to an embodiment. FIG. 3 illustrates a schematic view of a fuel delivery system 300 with a prime mover 271, according to another embodiment. It will be appreciated that the prime mover 270 of FIG. 2 and the prime mover 271 of FIG. 3 can be the prime mover 21 of FIG. 1A, the power module 112 of FIG. 1B, or the prime mover 87 of FIG. 1C. Arrows in FIGS. 2 and 3 show the direction of the fuel flow. It will be appreciated that a first apparatus is disposed "downstream" of a second apparatus if the fuel flows from the second apparatus to the first apparatus. A first apparatus is disposed "upstream" of a second apparatus if the fuel flows from the first apparatus to the second apparatus. It will be appreciated that the arrows can also indicate fuel lines (e.g., fuel pipes) that connect the first apparatus and the second apparatus in the fuel delivery system 200.

As show in FIG. 2, the fuel delivery (or injection) system 200 includes a fuel tank 210. The rest of the fuel delivery system 200 (e.g., the prime mover 270, etc.) is disposed higher than the fuel tank 210 in a vertical direction. It will be appreciated that the fuel tank 210 location can be important to manage fuel pressure of the fuel delivery system and is accounted for in the fuel delivery system design. It will be appreciated that a fuel tank that is low (in a vertical direction) compared to the rest of the fuel delivery system may cause lower fuel pressures due to the height rise when compared to a fuel tank that is high relative to the rest of the fuel delivery system. In an application, a fuel tank well below (e.g., at or about six feet (or any other suitable distance) below) the prime mover may be advantageous as the prime mover manufacturer may require a level of vacuum (e.g., in an embodiment, approximately −50 to 10 kilopascals or approximately −7.25 psi to 1.45 psi) at the fuel inlet of the prime mover.

The fuel delivery system 200 also includes a pump 220, a first filter 230, a pressure regulator 240, a strainer 250, a second filter 260, a prime mover 270, and a bleeder 280.

A fuel line (e.g., a fuel pipe) is connected between the fuel tank 210 and the strainer 250. The strainer 250 is disposed downstream of the fuel tank 210, and fuel flows from the fuel tank 210 to the strainer 250. In an embodiment, a diameter of such fuel line can be at or about ¼ inch, and the length of such fuel line can be at or about 30 to 40 feet. In an embodiment, the strainer 250 can be a part of and be disposed within the pressure regulator 240. In another embodiment, the strainer 250 can be a part of and be disposed within the pump 220. In yet another embodiment, the strainer 250 can be an independent component of the fuel delivery system 200. It will be appreciated that in an embodiment, to keep the pump 220 durable, there can be a requirement to have a predetermined level of filtration on the inlet of the pump, and the strainer 250 can be sized to protect the pump 220.

At point J, fuel flow from the strainer 250 and fuel flow from the pressure regulator 240 can be combined as fuel flow to an inlet (not shown) of the pump 220. In an embodiment, the pump 220 is an electric fuel pump. In an embodiment, the pump 220 is a positive displacement type fuel pump.

It will be appreciated that in an embodiment, the pump 220 can be sized to provide a greater fuel flow rate than the fuel flow requirements and/or demands of the prime mover under any suitable conditions. For example, fuel flow rate is increased as the fuel temperature increases. In an embodiment, a fuel flow rate requirement can be up to at or about 0.4 gallons per minute. The pump 220 may provide more flow rate than the prime mover fuel flow rate requirement. The pump 220 may provide such fuel flow under the expected maximum system restriction conditions (e.g., fuel viscosity, filter loading, etc.) as well.

In an embodiment, the fuel lines between the fuel tank and the pump 220 can be a negative pressure, which depends on how long the fuel line is, how viscous the fuel is, and/or how much fuel flow is passing through the fuel line. The pump 220 pumps the fuel (and picks up the fuel pressure) to go through the first filter 230 with a first predetermined fuel pressure (e.g., up to at or about 25 psi or at any other suitable pressure) at the pump outlet.

The first filter 230 can be a coarse particle filter and/or water separator. On the clean side of the first filter 230, the fuel pressure transitions to a regulated pressure at point D (or between the first filter 230 and the second filter 260, or between the pressure regulator 240 and the first/second filters (230, 260)). It will be appreciated that due to the flow restriction on the first filter 230, the fuel pressure at point C may be higher than the fuel pressure at point D. Similarly, due to the flow restriction on the second filter 260 (e.g., a fine particle filter), the fuel pressure at point D may be higher than the fuel pressure at point E. The fuel flow passes through the second filter 260 and then passes to the prime mover 270.

It will be appreciated that the first filter 230 and/or the second filter 260 can be configured to remove e.g., impurities from the fuel, protecting the prime mover fuel system components. In performing the filtration function, the filters (230, 260) may also restrict the fuel system as they load up with debris. As such, how the filters (230, 260) are located in the fuel delivery system with respect to the pressure regulator 240 can be important to control the range of fuel pressure the prime mover is exposed to.

From the prime mover 270 back to the fuel tank 210 is a fuel return path/line/pipe. It will be appreciated that the injection pump (not shown, can be an electrical injection pump in an embodiment, or a mechanical injection pump in another embodiment) of the prime mover 270 draws fuel from the fuel supply line to the prime mover 270, consumes a portion of the fuel in a combustion cycle and returns the remaining fuel flow to the fuel delivery system. The prime mover 270 uses the fuel to cool injection components so that the return fuel is always hotter than the supply fuel. It is expected that the return fuel is returned directly to the fuel tank 210 and is not recirculated into the fuel supply line, except in the fuel tank 210.

The fuel return path starts at an outlet of the prime mover 270 with a diameter that can be about ¼ inch or larger. When the fuel return path gets to point G, the fuel return path enters the housing of the pressure regulator 240 where it communicates with the reference port (e.g., 420 of FIG. 4) and then runs back to the fuel tank 210. It will be appreciated that the pump 220 may not vary the fuel flow but the prime mover 270 can (e.g., by consuming a portion of the fuel). The pump 220 provides a fuel flow that can exceed the requirements or demands of the prime mover 270, and thus there can be an excess fuel flow that needs to be handled by the pressure regulator 240. The excess fuel flow is directed from point D to point I towards the pressure regulator 240. The pressure regulator 240 is configured to prevent over pressurizing of the fuel inlet of the prime mover 270. It will be appreciated that in an embodiment, the location of point D can be moved to the location of point E so that the excess fuel flow is directed from point E to point I towards the pressure regulator 240.

The bleeder 280 (e.g., an orifice or the like) is disposed in a port on a dirty side of the second filter 260. Since the rest of the fuel system 200 is above the fuel tank 210, air tends to rise and needs to be evacuated from the fuel supply/ delivery system for priming. For example, when the pump 220 is turned on, it is desirable for the air to be evacuated to supply the fuel into the prime mover 270. Also if there are air leaks or air bubble enters into the fuel delivery system for some reason, it is desirable for the air to be removed at the highest point (in a vertical direction) in the fuel delivery system to prevent the air from entering the prime mover 270.

In an embodiment, the bleeder 280 can be a small orifice. The bleeder 280 can be configured to bleed some amount of air into the fuel return line (e.g., from point F back to the fuel tank 210). It will be appreciated that over time, air can tend to build up in the filters (air traps 230, 260). In an embodiment, the bleeder 280 can be on the dirty side (incoming flow side) of the filter 260 because that is where the air tends to build in the filter 260, and the filter 260 is structured to exclude air to pass through. As such, the dirty side of the filter 260 can be a natural pocket for air to be removed from. In addition, the fuel pressure can be higher on the dirty side of the filter 260 than on the clean side (outgoing flow side) of the filter 260. As such, a positive pressure can be provided on the bleeder 280 to push air to the fuel return line (starting from point F to the fuel tank 210).

The prime mover 270 can include electronic injection systems (not shown). In an embodiment, the prime mover manufacturer may require negative pressure (or a vacuum condition) be applied to the fuel inlet of the prime mover. For such prime movers, the pressure setpoint of the pressure regulator 240 may be low (e.g., providing a slight vacuum such as 1-2 psi lower than atmospheric pressure or the like) compared with a pressure regulator using atmospheric pressure as a reference pressure, and the pressure regulator 240 may be displaced between the stages of filtrations (e.g., between the first filter 230 and the second filter 260). The low pressure setpoint of the pressure regulator 240 can reduce fuel pressure into the second filter 260. Restriction in the second filter 260 can further drop the fuel pressure to the prime mover 270. The second filter 260 can be sized so that the inlet pressure of the prime mover 270 can maintain in range (to meet manufacturer's requirement) over the life of the filter(s). By placing the pressure regulator 240 after the first filter 230, restriction on the first filter 230 up to a certain point may not impact inlet pressure of the prime mover 270. The effect of restriction on the first filter 230 may be the increase of outlet pressure of the pump 220. Such arrangement can provide robustness to conditions such as excessively dirty fuel and waxing caused by low fuel temperatures (e.g., from at or about −20° F. to at or about 40° F. or the like, such as for winter operation, especially with improperly treated fuel). It will be appreciated that the fuel line between point D and the second filter 260 can be small (e.g., with a diameter at or about 0.15 inch or under or the like) to create restriction to ensure a slight vacuum at point E.

At the pressure regulator 240, the fuel flow from point D via point I can serve as an input fuel flow and the fuel flow to point B via point J can serve as an output fuel flow. The output fuel flow combines with the fuel flow from the fuel tank and flows to point B where the inlet of the pump 220 is located. The pressure of the return fuel flow at point G serves as a reference pressure. See FIG. 4 for details.

FIG. 3 is similar to FIG. 2 except the components and/or arrangements downstream of the pump 220. In FIG. 3, the prime mover 271 is a prime mover with a mechanical injection pump (not shown) in the prime mover 271, and a second filter is not required so that the pressure to the prime mover 271 can keep a positive pressure at the fuel inlet of the prime mover.

In an embodiment, the bleeder 280 can be on the dirty side (incoming flow side) of the filter 230 because that is where the air can tend to build in the filter 230, and the filter 230 is structured to prevent air from passing through. As such, the dirty side of the filter 230 is a desired location for air to be removed from. In addition, the fuel pressure can be higher on the dirty side of the filter 230 than on the clean side (outgoing flow side) of the filter 230. As such, a positive pressure can be provided on the bleeder 280 to push air to the fuel return line (starting from point F to the fuel tank 210).

The prime mover 271 can have a positive pressure requirement (e.g., at or about −1.45 psi to at or about 14.5 psi) at the fuel inlet of the prime mover 271. In an embodiment, the pressure regulator 240 can still be disposed after the first filter 230. Since there is no second filter, the pressure regulator 230 can manage/control the fuel pressure directly at the inlet of the prime mover 271. In an embodiment, the pressure setpoint of the pressure regulator 240 may be higher (e.g., from at or about −1.45 psi to at or about 14.5 psi or the like) to bring the fuel pressure within range (of the manufacturer's requirement) for the prime mover 271. The benefits of the pressure regulator 240 being located after the first filter 230 can be the same as for prime mover 270 of FIG. 2, but without the second filter, there can be a steadier inlet pressure for the prime mover 271 over the life of the filter 230.

Figure 4:
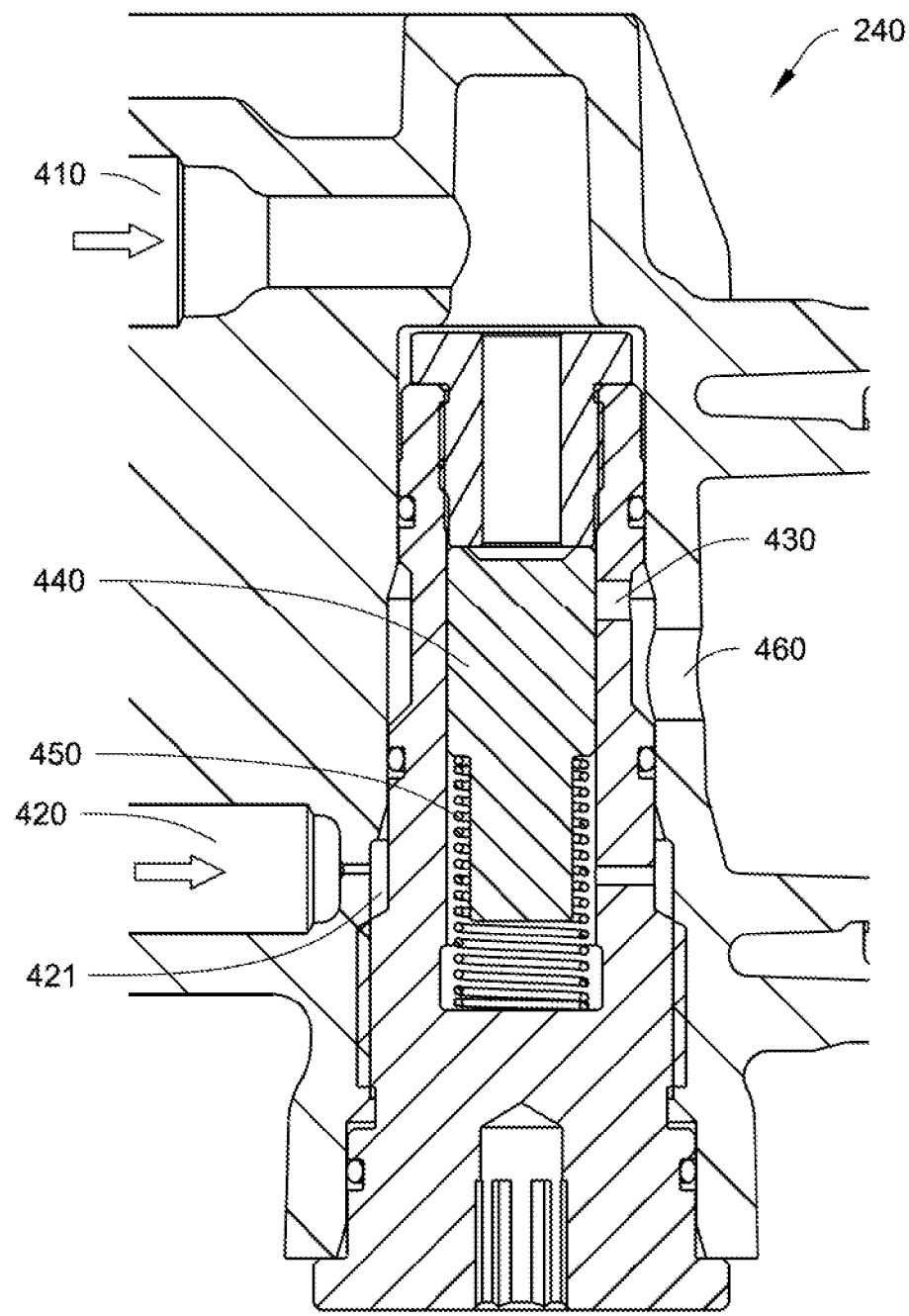
FIG. 4 illustrates a schematic cross sectional view of pressure regulator of a fuel delivery system, according to an embodiment.

FIG. 4 illustrates a schematic cross sectional view of pressure regulator 240 of the fuel delivery systems (200, 300) of FIGS. 2 and 3, according to an embodiment. It will be appreciated that detailed descriptions of the structure and design of pressure regulator(s) can be found in the following applications which are hereby incorporated by reference in their entirely: U.S. Pat. Nos. 4,249,389, 4,635,671 and 4,932,841.

The pressure regulator 240 includes an inlet port 410. In an embodiment, the inlet port 410 is disposed near point I of FIGS. 2 and 3 to accept fuel flow from point D. The pressure regulator 240 also includes a piston 440. In an embodiment, the piston 440 is a spring loaded piston. In another embodiment, the piston 440 could also be a diaphragm. In yet another embodiment, the excess flow can be sent to the return line. In such embodiment, the bypass port 430 may communicate with the reference port 420 instead of being routed to the fuel pump. The pressure regulator 240 further includes a reference port 420. In an embodiment, the reference port 420 is disposed under point G of FIGS. 2 and 3 to accept return fuel flow from point F. Also the pressure regulator 240 includes a bypass port 430.

In operation, the fuel pressure of the fuel flow received from the inlet port 410 pushes on one side (e.g., the upside) of the piston 440, and the fuel pressure from the reference port 420 serves as a reference pressure that acts with a spring 450 to push back on the piston 440. As the fuel pressure from the inlet port 410 increases, the piston 440 opens and exposes the bypass port 430. That is, as the pressure from the inlet port 410 increases, the force on the piston 440 from a hydraulic pressure area compresses the spring 450. Once the piston 440 starts to expose the bypass port 430, excess fuel flow (from point D of FIGS. 2 and 3) flows into the bypass port 430. The fuel pressure from the reference port 420 (that communicates with an annual passage 421) acts as a reference pressure. It will be appreciated that a non-circular reference port can be used in an embodiment.

The reference pressure pluses any spring force from 450 may be overcome by the pressure from the inlet port 410 in order to expose the bypass port 430 (so that fuel flow from the inlet port 410 flows to the bypass port 430 and then to an outlet port). If a sum of the reference pressure and the pressure from the spring force from 450 is less than the pressure from the inlet port 410, the bypass port 430 is not exposed, and no fuel flow from the inlet port 410 flows to the bypass port 430. It will be appreciated that a pressure from the inlet port 410 that is sufficient to just expose the bypass port 430 can be defined as a cracking pressure. An increase in pressure from the inlet port 410 that is sufficient enough to expose the entire bypass port 430 can be defined as an override pressure.

The design of the pressure regulator 240 can be adjusted to get a desired (predetermined) cracking pressure and/or override pressure and to get a desired pressure at the fuel inlet of a prime mover. For example, to get the desired cracking pressure and/or override pressure, a stiffness of the spring 450 can be changed, a location of the bypass port 430 relative to the piston 440 can be changed, the spring rate of the spring 450 can be changed, the number (e.g., can have multiple bypass ports at a same vertical location or at different vertical locations) and/or the diameter of the bypass port(s) can be changed, the diameter of the piston 440 can be changed (because pressure×area=the force on the piston), the diameter of the inlet port 410 and/or the diameter of the reference port 420 can be changed, etc. In an embodiment, multiple smaller bypass ports can be located at a same vertical location to allow for the same flow capacity (as a single bigger bypass port with a same cracking pressure) with a lower override pressure because the piston 440 does not need to move as far to expose the bypass ports (compared with a single bigger bypass port with a same cracking pressure), and the multiple bypass ports may allow for an equivalent flow rate as a single bigger bypass port. In another embodiment, a single large bypass port can be provided with a same cracking pressure (as those multiple bypass ports) so that the piston 440 needs to be taken even further to expose the bypass port which has an increased flow area (compared with multiple bypass ports).

The pressure regulator 240 also includes a main port 460. The main port 460 can be configured to receive the fuel flow from the fuel tank. The fuel flow from the bypass port 430 can be combined with the fuel flow from the main port 460 and flow to an outlet port (not shown, at around point J in FIGS. 2 and 3) and then to the pump (e.g., 220 of FIGS. 2 and 3).

Referring back to FIGS. 2 and 3, the pressure regulator 240 can be configured to control the pressure difference between points I and G. As the pressure at point I exceeds a predetermined level, more fuel flow (from point D) may bypass the pressure regulator 240 to point J. At point J, the bypass fuel mixes with the incoming fuel supply from the fuel tank 210, and flows to the pump 220.

It will be appreciated that the pressure regulator 240 is designed to control the inlet pressure of the prime mover (270, 271) within the limits or ranges prescribed by the prime mover manufacturer. The pressure regulator 240 is designed to regulate the difference in flow rate between the pump 220 and the prime mover (270, 271). When the pump flow rate is high and the prime mover demand is low, there can be a large amount of fuel that needs to be handled by the pressure regulator 240. The pressure regulator 240's port size(s) and pressure override (pressure control rises as flow increases) may be designed to maintain inlet pressure of the prime mover (270, 271) under all suitable conditions (e.g., filter loading changes, etc.).

It will also be appreciated that in FIGS. 2 and 3, the pressure regulator 240 is designed to maintain pressure relative to the return line pressure from the prime mover (270, 271). This carries a few advantages for the fuel delivery system. First, compared with a traditional diaphragm pressure regulator that is designed to maintain pressure relative to atmospheric pressure, the traditional regulator requires a dynamic seal between the fuel and the atmosphere. Also the diaphragm of the traditional regulator is usually a rubber element which has a finite life, especially when exposed to fuels and is prone to failure, resulting in fuel leakage. Using the return fuel line as a reference pressure can allow the design to use a piston (e.g., 440 of FIG. 4) without a seal as some degree of leakage may be acceptable and it is actually desirable for lubrication. In the embodiments disclosed herein, there may still be a seal required relative to atmosphere, but the seal can be a static seal which is much easier to design for long life than a dynamic seal in the traditional regulator. Another advantage of using the return fuel line as a reference pressure is that the prime mover manufacturer can require a slight vacuum be applied to the fuel inlet of the prime mover at all times. Since the return fuel line is actually under a slight vacuum (because the fuel tank 210 is below the rest of the fuel delivery system), this is easy to achieve with a relatively low (e.g., between atmospheric pressure and at or about one psi positive pressure or the like) regulated pressure setpoint.

Figure 5:
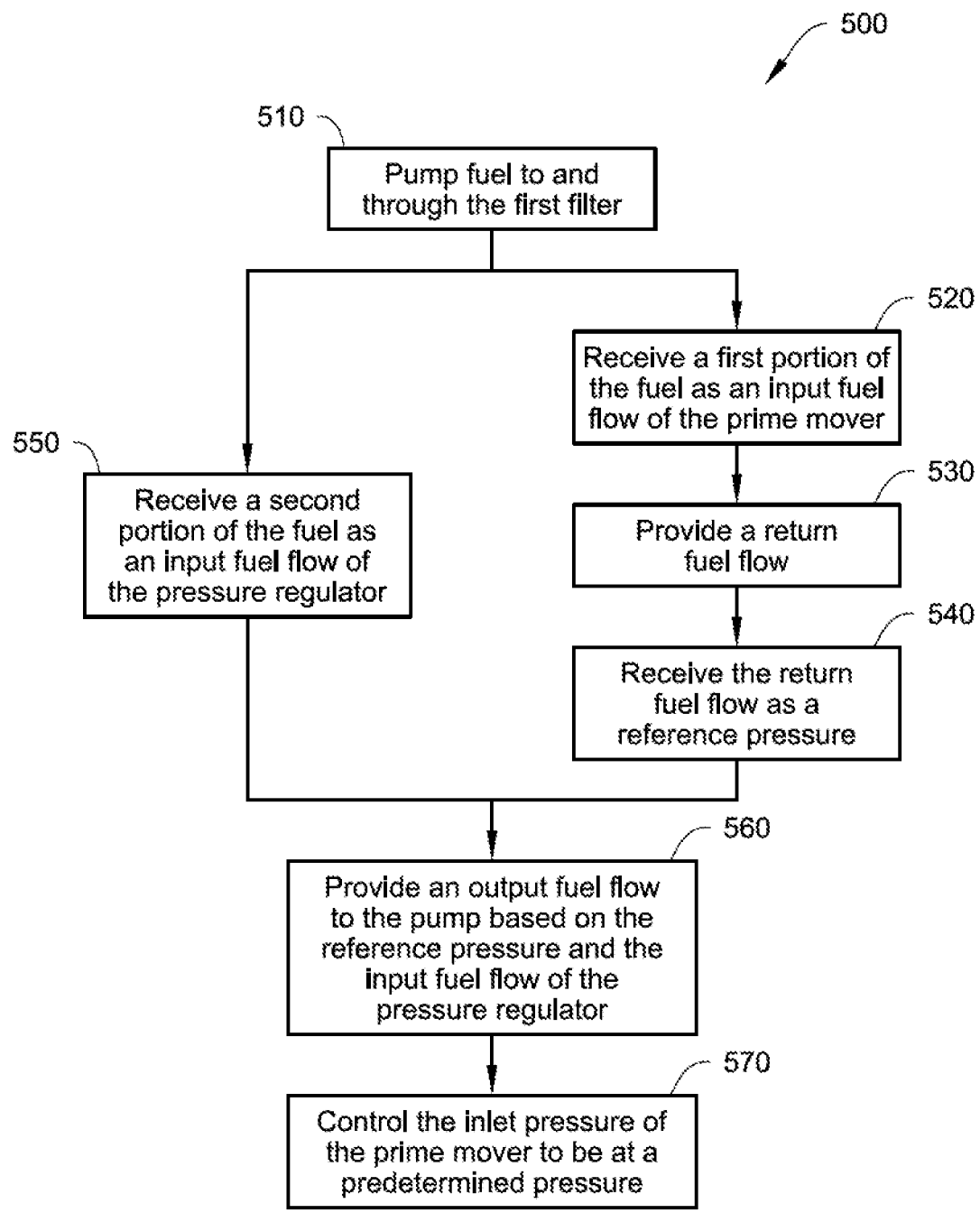
FIG. 5 is a flow chart illustrating a method for controlling an inlet pressure of a prime mover via a fuel delivery system, according to an embodiment.

FIG. 5 is a flow chart illustrating a method 500 for controlling an inlet pressure of a prime mover via a fuel delivery system, according to an embodiment. It will be appreciated the method 500 includes any other suitable method steps described throughout the disclosure. These additional steps can be part of, before, or after any method described below.

As shown in FIG. 5, the method 500 begins at 510, where a pump (e.g., 220 of FIGS. 2 and 3) pumps a first fuel flow from the fuel tank (e.g., 210 of FIGS. 2 and 3) to and through a first filter (e.g., 230 of FIGS. 2 and 3). Then the method proceeds to 520 and 550.

At 520, a prime mover (e.g., 270/271 of FIGS. 2 and 3) accepts or receives a first portion of the first fuel flow as an input fuel flow of the prime mover. The prime mover consumes some of the input fuel flow. Then the method proceeds to 530. At 530, the prime mover provides a return fuel flow. Then the method proceeds to 540. At 540, the pressure regulator accepts a pressure of the return fuel flow from 530 as a reference pressure. Then the method proceeds to 560.

At 550, a pressure regulator (e.g., 240 of FIGS. 2 and 3) accepts a second portion of the first fuel flow as an input fuel flow of the pressure regulator. Then the method proceeds to 560.

At 560, the pressure regulator provides an output fuel flow to the pump based on the reference pressure and the input fuel flow of the pressure regulator. Then the method proceeds to 570. At 570, the pressure regulator manages or controls the inlet pressure of the prime mover to be at a predetermined pressure.

It will be appreciated that embodiments disclosed herein use a pressure regulator that references pressure off the fuel return line. The pressure regulator is disposed in the fuel delivery circuit/system instead of in a fuel injection pump. The pressure regulator returns bypass/excess fuel flow to the pump inlet instead of to the fuel tank. In an application, the fuel line size is small in diameter (e.g., at or about ¼ inch). It will be appreciated that diameters of the fuel lines can provide desired pressure loss at the desired flow rate. When the diameter of the line is reduced, the restriction in the fuel line may be increased. If the bypass/excess fuel flow is returned back to the fuel tank, there can be a large flow rate for such line size which would carry negative consequences. For example, the return fuel line pressure may increase, which may exceed return pressure limitations of the prime mover, resulting in leakage of the injection pump. Also fuel tank supply line flow may be greatly increased to make up for the return flow, which may result in high supply line pressure drop. With the height rise and the fuel line length (e.g., at or about 30 feet) in such application this may cause cavitation at the fuel pump and result in prime mover shut down and/or fuel pump damage. Furthermore, the above issues may be managed by using larger fuel lines to and from the fuel tank, but the fuel lines may need to be significantly larger and may require the trailer design to be modified to fit. An embodiment disclosed herein can place the pressure regulator between stages of filtration. Generally the pressure regulator may be placed right at the prime mover to directly control the inlet pressure of the prime mover. Since in an embodiment, a slight vacuum is required, placing the pressure regulator before the secondary filter may provide extra assurance that the slight vacuum requirement is met.

In another embodiment, a variable speed or variable displacement pump and a pressure transducer placed at the prime mover inlet can be used to manage or control the prime mover inlet pressure. Based on the transducer output, the pump speed can be increased or decreased (e.g., via a controller) as necessary to manage or control the prime mover inlet pressure (e.g., to match the prime mover demands/requirements).

Testing including system performance (e.g., fuel pressure and temperature) testing with the fuel delivery system being mounted on a trailer under varying ambient temperatures is performed. The testing results show that the fuel flowing through the air bleeder properly has greatly reduced the prime mover inlet temperature and the prime mover inlet pressure.

Embodiments disclosed herein can provide a positive displacement pump with bypass flow from a pressure regulator returning to the pump inlet. Such embodiment can reduce a flow rate through the fuel tank supply and return lines, allowing the system to operate properly with long and/or small diameter lines. Embodiments disclosed herein can also provide regulator references return line instead of atmospheric pressure. Such embodiment can improve durability over diaphragm type designs (e.g., designs with no dynamic seals or the like), and/or allow pressure regulator to more easily control lower pressure values at the prime mover inlet. Embodiments disclosed herein can meet the requirements of varying conditions (e.g., fuel temperature, flow demanded by prime mover, amount of filter restriction, or the like) requiring active control of pressure to maintain prime mover inlet pressure in a desired range.

Aspects:

It is appreciated that any one of aspects 1-14 can be combined with any one of aspects 15-20.

Aspect 1. A fuel delivery system for controlling an inlet pressure of a prime mover in a transport climate control system, the fuel delivery system comprising:

a fuel tank;
a pressure regulator;
a pump disposed downstream of the fuel tank;
a first filter disposed downstream of the pump; and
the prime mover disposed downstream of the first filter,
wherein the prime mover is located above the fuel tank in a vertical direction,
the pump is configured to provide a first fuel flow through the first filter,
the prime mover is configured to accept a first portion of the first fuel flow as an input fuel flow and is configured to provide a return fuel flow,
the pressure regulator is disposed downstream of the first filter, the pressure regulator is configured to accept a second portion of the first fuel flow as an input fuel flow and to accept a pressure of the return fuel flow as a reference pressure.

Aspect 2. The system according to aspect 1, further comprising:
a bleeder configured to bleed air to the return fuel flow that flows back to the fuel tank.

Aspect 3. The system according to aspect 2, wherein the bleeder is an orifice.

Aspect 4. The system according to aspect 2 or aspect 3, wherein the bleeder is disposed downstream of the pump and upstream of the first filter.

Aspect 5. The system according to any one of aspects 1-4, further comprising:
a second filter disposed downstream of the first filter and upstream of the prime mover.

Aspect 6. The system according to aspect 5, further comprising:
a bleeder configured to bleed air to the return fuel flow that flows back to the fuel tank.

Aspect 7. The system according to aspect 6, wherein the bleeder is disposed downstream of the first filter.

Aspect 8. The system according to aspect 6 or aspect 7, wherein the bleeder is an orifice.

Aspect 9. The system according to any one of aspects 1-8, further comprising a strainer disposed between the fuel tank and the pump.

Aspect 10. The system according to aspect 9, wherein the strainer is disposed inside the pump.

Aspect 11. The system according to any one of aspects 1-10, wherein the pressure regulator is configured to provide an output fuel flow to the pump.

Aspect 12. The system according to any one of aspects 1-11, wherein the pressure regulator is configured to control the inlet pressure of the prime mover to be at a predetermined pressure.

Aspect 13. The system according to aspect 12, wherein the predetermined pressure is a negative pressure.

Aspect 14. The system according to aspect 12, wherein the predetermined pressure is a positive pressure.

Aspect 15. A method of controlling an inlet pressure of a prime mover via a fuel delivery system in a transport climate control system, the fuel delivery system including a fuel tank, a pressure regulator, a pump disposed downstream of the fuel tank, a first filter disposed downstream of the pump, and the prime mover disposed downstream of the first filter, wherein the prime mover is located above the fuel tank in a vertical direction, and the pressure regulator is disposed downstream of the first filter,
the method comprising:
pumping, by the pump, a first fuel flow through the first filter;
accepting, by the prime mover, a first portion of the first fuel flow as an input fuel flow;
providing, by the prime mover, a return fuel flow;
accepting, by the pressure regulator, a second portion of the first fuel flow as an input fuel flow; and
accepting, by the pressure regulator, a pressure of the return fuel flow as a reference pressure.

Aspect 16. The method according to aspect 15, further comprising:
providing, by the pressure regulator, an output fuel flow to the pump.

Aspect 17. The method according to aspect 15 or aspect 16, further comprising:
controlling, by the pressure regulator, the inlet pressure of the prime mover to be at a predetermined pressure.

Aspect 18. The method according to aspect 17, wherein the predetermined pressure is a negative pressure.

Aspect 19. The method according to any one of aspects 15-18, further comprising:
bleeding, by a bleeder, air to the return fuel flow that flows back to the fuel tank.

Aspect 20. The method according to any one of aspects 15-19, further comprising:
directing a fuel flow through a second filter after the fuel flow passes through the first filter.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:
1. A fuel delivery system for controlling an inlet pressure of a prime mover in a transport climate control system, the fuel delivery system comprising:
a fuel tank;
a pressure regulator including an inlet port, a by-pass port, and a reference port;
a pump disposed downstream of the fuel tank;
a first filter disposed downstream of the pump; and
the prime mover disposed downstream of the first filter,
wherein the prime mover is located above the fuel tank in a vertical direction,
the pump is configured to provide a first fuel flow through the first filter,
the prime mover is configured to accept a first portion of the first fuel flow as an input fuel flow and is configured to provide a return fuel flow,
the pressure regulator is disposed downstream of the first filter, the pressure regulator is configured to accept a second portion of the first fuel flow as an input fuel flow to the inlet port and to accept a pressure of the return fuel flow to the reference port as a reference pressure, and when the reference pressure exceeds a threshold, a by-pass fuel flow from the inlet port to the by-pass port is routed to the pump.

2. The system according to claim 1, further comprising: a bleeder configured to bleed air to the return fuel flow that flows back to the fuel tank.

3. The system according to claim 2, wherein the bleeder is an orifice.

4. The system according to claim 2, wherein the bleeder is disposed downstream of the pump and upstream of the first filter.

5. The system according to claim 1, further comprising: a second filter disposed downstream of the first filter and upstream of the prime mover.

6. The system according to claim 5, further comprising: a bleeder configured to bleed air to the return fuel flow that flows back to the fuel tank.

7. The system according to claim 6, wherein the bleeder is disposed downstream of the first filter, or the bleeder is an orifice.

8. The system according to claim 1, further comprising a strainer disposed between the fuel tank and the pump.

9. The system according to claim 8, wherein the strainer is disposed inside the pump.

10. The system according to claim 1, wherein the pressure regulator is configured to control the inlet pressure of the prime mover to be at a predetermined pressure.

11. The system according to claim 10, wherein the predetermined pressure is a negative pressure or a positive pressure.

12. A method of controlling an inlet pressure of a prime mover via a fuel delivery system in a transport climate control system, the fuel delivery system including a fuel tank, a pressure regulator including an inlet port, a by-pass port, and a reference port, a pump disposed downstream of the fuel tank, a first filter disposed downstream of the pump, and the prime mover disposed downstream of the first filter, wherein the prime mover is located above the fuel tank in a vertical direction, and the pressure regulator is disposed downstream of the first filter, the method comprising:

pumping, by the pump, a first fuel flow through the first filter;

accepting, by the prime mover, a first portion of the first fuel flow as an input fuel flow;

providing, by the prime mover, a return fuel flow;

accepting, by the pressure regulator, a second portion of the first fuel flow as an input fuel flow to the inlet port; and accepting, by the pressure regulator, a pressure of the return fuel flow to the reference port as a reference pressure, wherein when the reference pressure exceeds a threshold, a by-pass fuel flow from the inlet port to the by-pass port is routed to the pump.

13. The method according to claim 12, further comprising:

controlling, by the pressure regulator, the inlet pressure of the prime mover to be at a predetermined pressure.

14. The method according to claim 13, wherein the predetermined pressure is a negative pressure.

15. The method according to claim 12, further comprising:

bleeding, by a bleeder, air to the return fuel flow that flows back to the fuel tank.

16. The method according to claim 12, further comprising:

directing a fuel flow through a second filter after the fuel flow passes through the first filter.

17. The system according to claim 1, wherein the return fuel flow communicating with the reference port flows directly back to the fuel tank.

18. The system according to claim 1, wherein when the reference pressure exceeds the threshold, the by-pass fuel flow from the inlet port to the by-pass port is routed directly to the pump.

19. The system according to claim 1, wherein the first fuel flow through the first filter includes the first portion of the first fuel flow to the prime mover and the second portion of the first fuel flow to the inlet port of the pressure regulator.

20. The system according to claim 5, wherein the first fuel flow through the first filter includes the first portion of the first fuel flow to the second filter and the second portion of the first fuel flow to the inlet port of the pressure regulator.

* * * * *